Patented Apr. 16, 1940

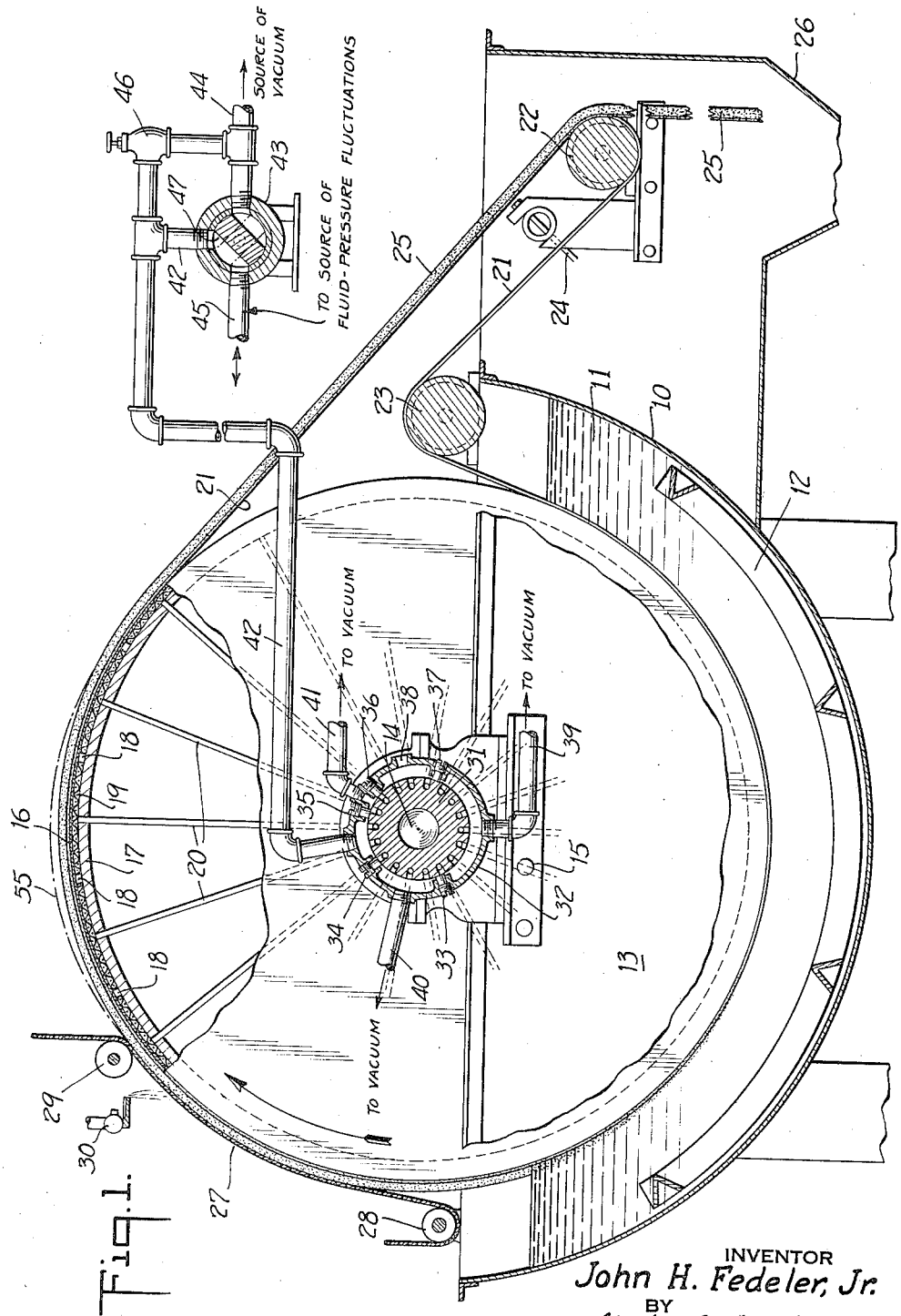

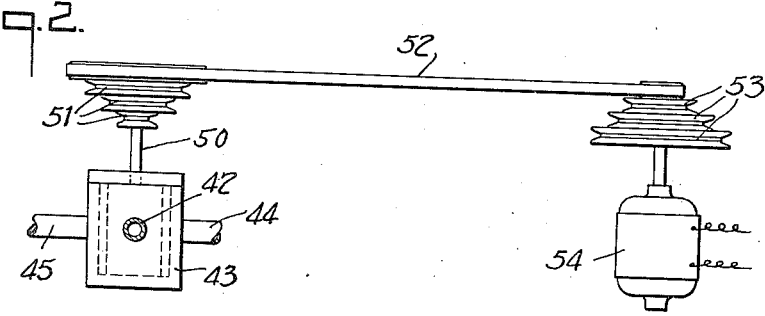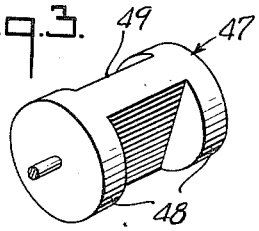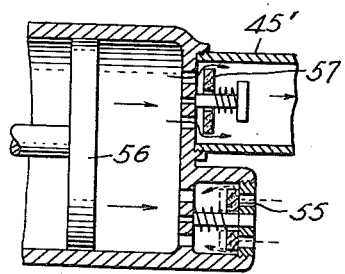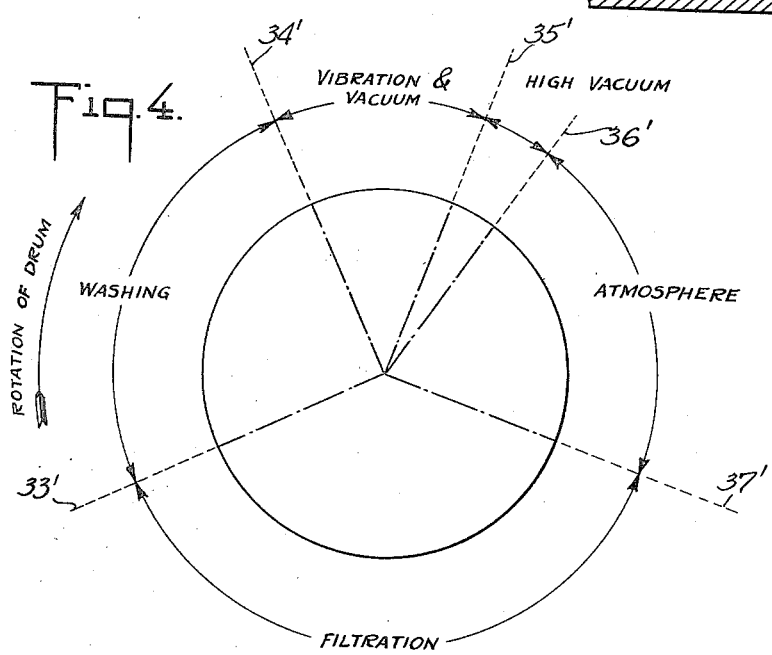

2,197,610

UNITED STATES PATENT OFFICE 2,197,610

FILTER INSTALLATION AND FILTERING PROCEDURE

John H. Fedeler, Jr., Ridgewood, N. J., assignor to Thos. C. Stephens, Scarsdale, N. Y.

Application June 9, 1938, Serial No. 212,679

7 Claims. (Cl. 210—197)

My present invention relates generally to a filter installation, and to a filtering procedure, and has particular reference to certain improvements relating to the treatment of the filter cake.

The invention has primary applicability to a filtering process in which a filter cake is formed by withdrawal of liquid from a slurry, this being preferably accomplished by means of a so-called vacuum filter. In an installation of this kind there is a filtering medium upon which the cake is adapted to form, coupled with a means for applying a vacuum to the filter cake from underneath, i. e., through the filter medium which supports the cake.

While, from certain aspects, my invention is not restricted to any particular type of filter installation, nevertheless I prefer to employ a rotary drum filter in which the filter medium is arranged on the periphery of a circular drum rotatably mounted in association with a slurry tank so that the lower portion of the drum is immersed in the slurry. Associated with the drum is a series of conduits which communicate with successive portions of the drum surface, and cooperate with a special type of valve, such as that shown, for example, in United States Patent #1,872,209. By means of this valve, the conduits successively establish desired communications with a source or sources of vacuum, with the atmosphere, or other fluid-pressure source.

Preferably, the filter drum is also associated with a suitable means for washing the cake, and with a suitable instrumentality for reinforcing the cake and ultimately stripping it from the drum. The latter arrangement may, for example, comprise a plurality of spaced "strings" of the general character illustrated in United States Patent #1,880,005.

A general object of the present invention is to provide a special mode of treatment, and a special filter installation for handling filter cakes which manifest the peculiar property known as "slumping". Merely by way of example, I might mention that starch is a material which is typically subject to this phenomenon.

A filter cake which is susceptible to "slumping" or "re-puddling" will permit liquid to be withdrawn from it, by a vacuum to a degree which leaves the filter cake in a condition which is apparently dry enough to permit further handling of the cake as a solid material. In the case of starch, this apparently dry condition is reached after all but approximately 46% of liquid has been withdrawn from the cake.

Strangely enough, however, when such a cake is agitated, as by handling, or by the mere impact of the cake against a receiving hopper or the like, the cake reverts with surprising rapidity to a substantially wet and pasty condition. This is known as "re-puddling", and the cake is said to "slump", and the further handling of the cake is thereby complicated. This undesirable phenomenon can be avoided by a relatively slight further withdrawal of liquid from the cake. In the case of starch, if sufficient liquid is withdrawn to leave only about 42% in the cake instead of 46%, slumping may be avoided.

In accordance with my present invention this desirable objective is achieved by subjecting the cake to vibration prior to the final vacuum treatment; and it is a particular feature of my invention to effect this vibration by fluid-pressure means, preferably effective on the cake from underneath.

In the preferred practice of my invention, the filter medium which supports the cake is itself subjected to a vibratory agitation, thereby subjecting the cake above it to an unusually efficient vibration which deliberately brings about the "re-puddling" which would subsequently be of disadvantageous character. The additional liquid released from the cake by this "re-puddling" is thereupon withdrawn from the cake by means of a vacuum.

It is a further characterizing feature of the present invention to subject the cake to alternations of vibration and vacuum, preferably by periodically vibrating the filter medium, and by applying vacuum to the cake in the interims.

I am enabled to accomplish this desirable result in an extremely simple and efficient manner by making use of the conduits and valve of the vacuum-producing means. More particularly, I provide an arrangement for successively employing the conduits to establish communication with a suitable source of fluid-pressure fluctuations. To bring about periodic vibrations, and intermediate vacuum treatment, I provide a special valve arrangement which alternately furnishes vacuum and fluid-pressure fluctuations to the conduits.

My invention also provides means for varying the rate of alternations.

I achieve the foregoing objects and such other objects as may hereinafter appear or be pointed out, in the manner illustratively exemplified in the accompanying drawings, wherein—

Figure 1 is an elevational view, partly in cross-section and partly diagrammatic, showing a rotary drum filter installation by means of which the present procedure may be carried out, Figure 2 is a plan view of certain auxiliary apparatus, Figure 3 is an enlarged perspective view of the special valve member, Figure 4 is a diagrammatic view showing a preferred installation and procedural sequence, and Figure 5 is a fragmentary cross-sectional view through a piston pump, illustrating one possible source of fluid-pressure fluctuations.

At 10 I have illustrated a conventional slurry tank adapted to accommodate a slurry 11 and preferably provided with a slurry agitator 12. A drum 13 is mounted for rotation upon a shaft or trunnion 14 suitably journaled in bearings 15 secured in any desired manner to the tank 10 or to the floor. As viewed in Figure 1, the drum is made to rotate slowly in a clockwise direction, and this rotation is brought about by any suitable driving mechanism, which is not shown in the drawings since it forms no essential part of the present invention.

The drum is mounted so that its lower portion is immersed in the slurry 11. The peripheral surface of the drum carries a filtering medium 16 upon which the filter cake is adapted to form. This filter medium may be of any suitable character such as cloth or fabric and is secured in position in any conventional manner. I have illustratively shown the rigid drum surface 17 divided by projections 18 into a series of separate compartments, in each of which a pervious screen 19 is arranged, upon which the filter medium 16 is mounted. Communicating with these separate chambers are the substantially radial conduits 20 which communicate, through the screens 19, with the underside of the filter medium 16.

In the filter which I have chosen for illustration, I have shown a series of reinforcement strings designated 21 which travel tangentially away from the drum, and thence around rollers 22 and 23. The comb 24 serves to keep the elements 21 in proper spaced relationship, and the relatively strong curvature of the roller 22 facilitates the separation of the filter cake 25 from the strings 21, so that the filter cake may fall, as shown in Figure 1, into a suitable hopper 26, or other receiving device.

I have also chosen to illustrate a wash belt 27 which is of endless character and extends around suitable guide rollers, two of which, designated 28 and 29, are shown in Figure 1. A device 30 such as a perforated pipe or the like, serves to furnish washing liquid to the belt 27, and the latter is adapted to permit this liquid to percolate through it, thence into and through the filter cake 25, to wash the latter.

The inner ends of the conduits 20 communicate with a suitable valve which may, for example, be substantially of the character illustrated in United States Patent #1,872,209. The details of this valve need not therefore be described, but I will point out that it includes a rotating part 31 which has permanent connections to the conduits 20 and which rotates with these conduits and with the drum. This movable portion of the valve travels within a fixed valve ring 32 which is divided, at selected circumferentially spaced points by partitioning plugs 33—37 inclusive. The plug 33 is optional, as will be pointed out hereinafter.

The chamber between the plugs 36 and 37 communicates with the atmosphere as shown at 38. The chamber between the plugs 37 and 33 communicates by the pipe 39 with a suitable source of vacuum, such as a vacuum pump or the like. The chamber between the plugs 33 and 34 communicates by a pipe 40 to a suitable source of vacuum, preferably of somewhat higher degree than the vacuum in the pipe 39. The chamber between the plugs 35 and 36 communicates by the pipe 41 to a source of relatively high vacuum.

The chamber between the plugs 34 and 35 communicates by a pipe 42 with a special device illustrated in the upper right portion of Figure 1, and further illustrated in Figures 2 and 3. This special arrangement may assume any suitable form and I have illustratively shown a substantially cylindrical chamber 43 which communicates at 44 with a source of vacuum, at 42 with the main valve on the filter, and at 45 with a source of fluid-pressure fluctuations. A by-pass 46 may be optionally provided for.

Movably mounted on the inside of the chamber 43 is a valve member 47 which may, for example, partake of the configuration shown in Figure 3, whereby two spaced cylindrical portions 48 are connected by a diametric web 49, so that rotation or oscillation of the member 47 will connect the pipe 42 alternately with the pipe 44 and with the pipe 45.

I have illustrated an arrangement whereby the member 47 is continuously rotated. I have shown this member mounted on a shaft 50 provided with the stepped pulleys 51. A belt or equivalent driving member 52 connects with a complementary set of stepped pulleys 53 driven by a source of power such as the electric motor 54.

In Figure 4 I have diagrammatically indicated the procedural sequence of treatment of the filter cake on a filter installation of the particular character illustrated in Figure 1. Reference numerals 33'—37' are applied to the circumferential points which correspond to the locations of the partitioning plugs 33—37 of Figure 1. Preferably, in carrying out the invention, the angle between the points 33' and 37' is approximately 135°. It is in this region that the filtration of the slurry is initiated, by means of the vacuum applied through the pipe 39. This results in the formation of a filter cake which is supported on the drum surface as the latter emerges from the slurry.

The angle between the points 33' and 34' is preferably of approximately 90°, and it is during this stage that the filter cake is washed by means of the liquid caused to percolate through it from the pipe 30, and by means of the continued vacuum treatment supplied by the pipe 40.

The angle between the points 34' and 35' should be as large as possible, and may satisfactorily be approximately 45°. It is during this stage that the filter cake is subjected to alternate vibrations and vacuum, as a result of which the cake is re-puddled and the released liquid withdrawn.

The angle between the points 35' and 36' is approximately 15°, and it is at this stage that the filter cake is subjected to a pure vacuum of relatively high degree, supplied through the pipe 41.

In the region between the points 36' and 37' the filter cake is subjected to atmospheric pressure, whereby the strings 21 may leave the drum and carry the filter cake with them.

Depending upon the speed of movement or rotation of the valve member 47, the number of vibration periods to which the filter cake is subjected during its passage from the point 34' to the point 35', may be varied. If desired, there may be only one period of vibration, followed by one period of vacuum. On the other hand, there may be as many as 4 or 5 periods of vibration, with an equal number of intermediate periods of vacuum treatment.

It is possible within the purview of my invention to subject the cake, between the points 34' and 35', to fluid-pressure fluctuations alone, leaving it to the relatively high vacuum supplied by the pipe 41 to withdraw from the cake the liquid released as a result of the vibration.

Obviously, the rate of alternations, where alternations are used, may be varied by adjustments of the belt 52, or by adjustments of the speed of the motor 54, or both, or in any other suitable manner.

It will also be understood that the valve arrangement need not necessarily be mechanically driven, but may be purely electrical in character. That is, the movements of the valve member 47 or of any equivalent control member, may be influenced by an electromagnet or solenoid, or may be pneumatically or hydraulically controlled.

The source of fluid-pressure fluctuations may also be of any selected character. For example, the exhaust from a vacuum pump may be found to be adequate. Or, it may be preferable to employ intermittent pulsations from a source of fluid under pressure.

Merely by way of example, I have shown in Figure 5 the end of a conventional vacuum-pump cylinder, in which the inlet valve 55 leading to the atmosphere opens when the piston 56 moves to the left, and the exhaust or outlet valve 57 opens when the piston moves to the right. In this figure, the piston is shown completing its movement toward the right, and the valve 57 is shown open. The conduit 45 communicates with the pipe 45' into which the vacuum-pump exhaust is directed. In the pipe 45' there is a fluctuating pressure which serves as a convenient source of successive rapid variations in fluid pressure.

Regardless of what the nature of the fluid-pressure fluctuations may be, or the number or durations of the periods during which they are applied to the filter cake, it will be observed that the filter cake is agitated from underneath. In fact, it is the filter medium 16 which vibrates along with the filter cake, thereby bouncing the cake bodily up and down within the approximate range indicated by the dot and dash line 55 shown in Figure 1.

It is this up and down vibration, leaving the cake untouched and uncontacted by any physical external means, which so efficiently and rapidly releases additional liquid from the cake during this stage of the treatment. And it will be understood that the invention is by no means restricted to the treatment of a filter cake which "slumps", but is equally applicable to any filter cake which, when subjected to sufficient vibration, releases more liquid than it would if the vibration were absent. For example, tests have shown that a number of materials which do not show any signs of slumping, nevertheless produce a drier filter cake after vibration than before vibration.

The value of the present improved process and filter installation will be readily understood by those skilled in the art. In the case of starch, for example, it is customary to subject the starch filter cake, after the filtration procedure, to a thermic drying. If the cake is in slumped or re-puddled condition this drying treatment must be of considerable duration, with corresponding increased cost. If, on the other hand, the present procedure prevents the cake from slumping when it is discharged from the filter, the thermic treatment is not only greatly simplified and shortened, but there is a definite saving in the amount of heat which would otherwise have to be furnished to remove, thermically, the extra liquid removed by the present procedure.

It will be understood that the filter installation shown in the present drawings is merely illustrative. Under certain circumstances the reinforcing strings may, if desired, be caused to convey the cake to and through a drying chamber, or around an additional drum, or through other paths which are well known per se. Also, the plug 33 may be completely omitted, if desired, and the washing stage dispensed with, all without departing from the spirit and scope of the invention as expressed in the appended claims.

Having thus described my invention and illustrated its use, what I claim as new and desire to secure by Letters Patent is—

1. In a filter of the character described; a tank adapted to accommodate a slurry to be filtered; a filter drum partially immersed in said slurry and mounted for rotation about a horizontal axis; a filter medium on the peripheral surface of said drum; means for applying suction to the filter medium on the side adjacent to the drum, thereby forming on said medium a filter cake which is carried on the outside of the drum as the latter rotates; means for subjecting the cake from underneath, while the cake is in the uppermost region of its travel, first to a succession of rapid variations in fluid pressure to produce a vibration of the cake and thereby release liquid from the cake, and then to a period of vacuum to withdraw said liquid; and means for thereafter stripping the cake from the drum.

2. In a filter of the character described; a tank adapted to accommodate a slurry to be filtered; a filter drum partially immersed in said slurry and mounted for rotation about a horizontal axis; a filter medium on the peripheral surface of said drum; means for applying suction to the filter medium on the side adjacent to the drum, thereby forming on said medium a filter cake which is carried on the outside of the drum as the latter rotates; a source of successive rapid variations in fluid pressure; a source of vacuum; means for subjecting the cake from underneath, while the cake is in the uppermost region of its travel, to the alternate action of said sources, whereby the cake is intermittently vibrated to release liquid which is thereupon withdrawn; and means for thereafter stripping the cake from the drum.

3. In a filter, the combination with the elements set forth in claim 2, of means for varying the rate of said alternations.

4. In a filter of the character described; a tank adapted to accommodate a slurry to be filtered; a filter drum partially immersed in said slurry and mounted for rotation about a horizontal axis; a filter medium on the peripheral surface of said drum; means for applying suction to the filter medium on the side adjacent to the drum, thereby forming on said medium a filter cake which is carried on the outside of the drum as the latter rotates; a source of successive rapid variations in fluid pressure; a source of vacuum; means for subjecting the cake from underneath, while the cake is in the uppermost region of its travel, to the alternate action of said sources, whereby the cake is intermittently vibrated to release liquid which is thereupon withdrawn; said last-named means comprising a valve chamber communicating with said cake and said sources, and a movable valve member rendering said sources operative upon the cake in alternate succession; and means for thereafter stripping the cake from the drum.

5. In a filter, the combination with the elements set forth in claim 4, of means for varying the speed of the movements of said valve member.

6. In a continuous filtering and cake-conditioning procedure during which a filter cake is formed on a supporting filter medium and subsequently conditioned by withdrawal of liquid from the cake through said filter medium, the treatment which comprises bringing the filter medium to a substantially horizontal position with the filter cake resting on it, subjecting the cake to at least one period of vibration by applying a succession of rapid variations in fluid pressure to it from underneath, said vibration being insufficient to permanently dislodge the cake from said filter medium but serving to release additional liquid from the cake, and then subjecting the cake to a period of vacuum also applied to it through said filter medium so as to withdraw said released liquid from the cake.

7. In a continuous filtering and cake-conditioning procedure during which a filter cake is formed on a supporting filter medium and subsequently conditioned by withdrawal of liquid from the cake through said filter medium, the treatment which comprises bringing the filter medium to a substantially horizontal position with the filter cake resting on it, subjecting the cake to intermittent periods of vibration by applying a succession of rapid variations in fluid pressure to the cake from underneath during each period, said vibration being insufficient to permanently dislodge the cake from said filter medium but serving to release additional liquid from the cake, each of said vibration periods being followed by a period during which vacuum is applied to the cake from underneath to withdraw said released liquid from the cake through said filter medium.

JOHN H. FEDELER, Jr.